Feb. 5, 1952   M. THOMPSON ET AL   2,584,514
APPARATUS FOR MAKING A TOROID
Filed Dec. 9, 1947   4 Sheets-Sheet 1

MEYER THOMPSON
DANIEL T. THOMPSON
INVENTORS

BY

ATTORNEY

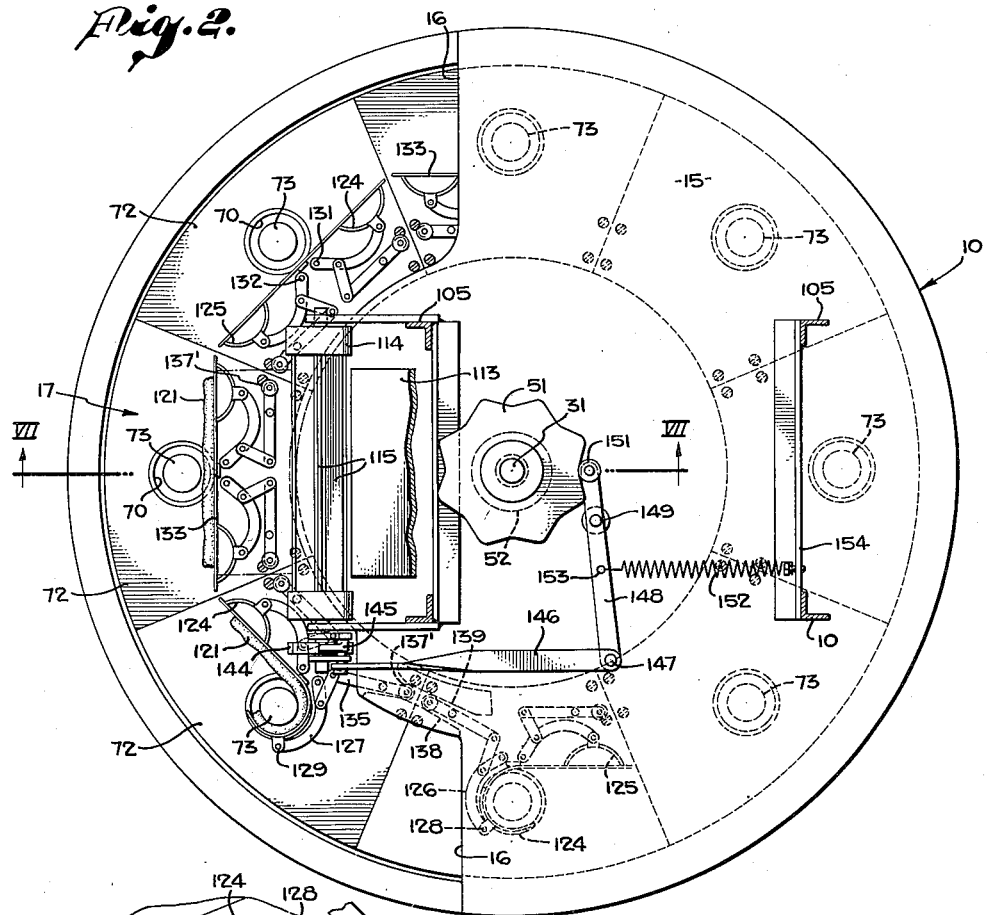
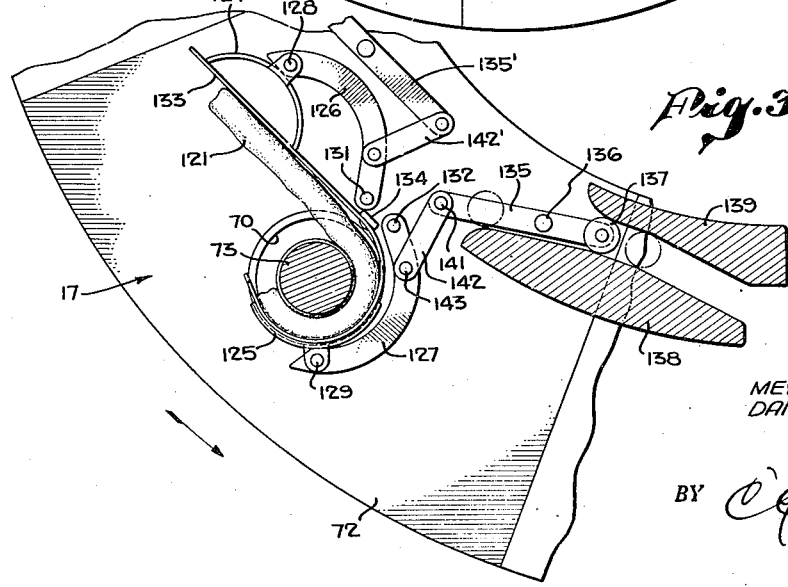

Feb. 5, 1952  M. THOMPSON ET AL  2,584,514
APPARATUS FOR MAKING A TOROID
Filed Dec. 9, 1947  4 Sheets-Sheet 3

MEYER THOMPSON
DANIEL T. THOMPSON
INVENTORS

BY

ATTORNEY

MEYER THOMPSON
DANIEL T. THOMPSON
INVENTORS

ATTORNEY

Patented Feb. 5, 1952

2,584,514

UNITED STATES PATENT OFFICE 2,584,514

APPARATUS FOR MAKING A TOROID

Meyer Thompson and Daniel T. Thompson,
Los Angeles, Calif.

Application December 9, 1947, Serial No. 790,688

15 Claims. (Cl. 107—8)

This invention relates to apparatus for forming plastic, deformable, pliant, compositions such as dough into the shape of a toroid. Machines have heretofore been provided for forming dough into the shape of a toroid, such as doughnut machines. However, the dough of certain products, such as that known as bagels, is of such a heavy, tough, elastic consistency that it can not be handled on doughnut machines and it has heretofore been necessary to form the bagel dough by hand. The dough is first rolled into cylindrical form and turned about the fingers of the operator to form a toroid with the ends overlapping. Then the overlapping ends are hand rolled into pressed, meshing, consolidated, integral relation, forming the toroid. This manner of manually forming the dough into a toroid is not only slow and inefficient, but due to the rolling of the overlapping ends, the result is an irregular deformed toroid.

It is, therefore, the primary object of this invention to provide apparatus for forming dough into circular toroid shape.

Another object is to provide apparatus for forming toroids of dough or other deformable plastic in a continuous and economical manner.

A further object is to provide apparatus having the above characteristics that will form divided dough into a cylindrical form and thereafter form the cylindrical shaped dough into a toroid.

A still further object is to provide apparatus for forming cylindrical shaped dough into circular form and rotating the circular form about its axis of revolution to form a homogenous, edible product in the shape of a toroid.

A still further object is to provide apparatus for continuously forming divided dough into cylindrical form, feeding the same onto a work table for forming cylindrical dough into a toroid and thereafter rotating the toroid in the direction of its main axis, whereby to form the toroid into a homogenous, integral mass.

Still other objects reside in the simplicity, the efficiency and durability of the apparatus, as well as its positive and efficient operation.

The above and other objects may be made apparent throughout the further description of the invention when taken in connection with the accompanying drawings, wherein like reference characters refer to like parts. It is to be understood that the drawings are not a definition of the invention but merely illustrate an exemplary form by means of which the invention may be effectuated.

In the drawings:

Fig. 2 is a sectional view taken along the line II—II of Fig. 1.

Fig. 3 is an enlarged, sectional view of a detail shown in Fig. 2.

Figure 1:
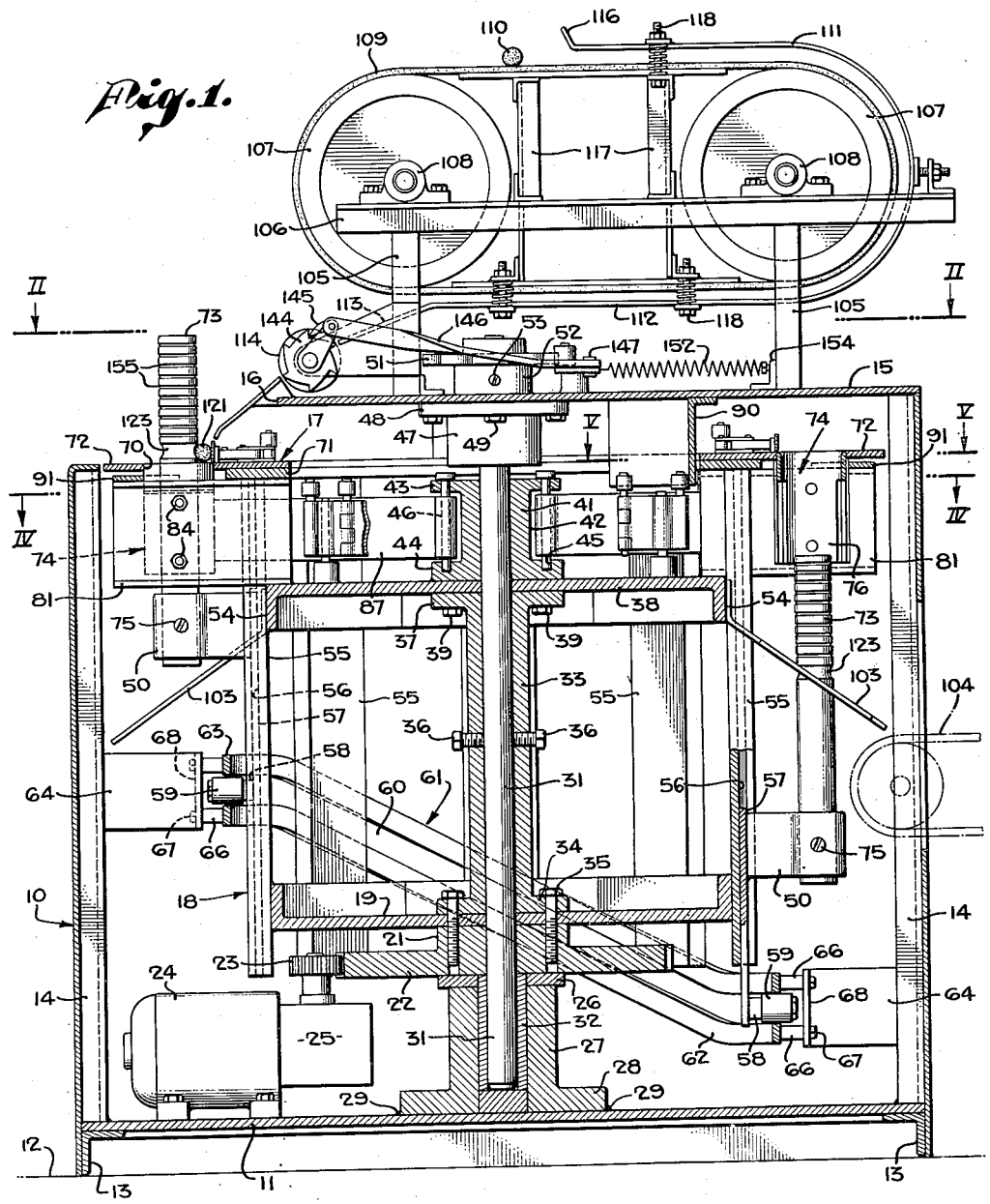
Fig. 1 is a vertical, sectional view of an apparatus embodying the invention.

The terms "torus" and "toroid" as used herein relate to shapes of objects resembling a doughnut, ring or tire; in their classical embodiment they are objects having a body circular in cross section, the object body being provided with a surface which would be generated by rotating the circle about an axis spaced from the circle.

In the form shown, the apparatus includes a housing, represented in its entirety by 10, the side walls of which may be cylindrical. The housing 10 is provided with a stationary bottom 11, which may be slightly elevated from the supporting foundation 12 by means of legs or angle members 13. Radially disposed about the outer edge of the bottom 11 are provided upwardly extending, vertical, channel-shaped supports 14. These supports 14 may be welded to or fixed to the housing 10 for stiffening and supporting the same. The housing 10 is provided with a top 15, the latter being cut away at 16 for rendering access to a work table, represented in its entirety by 17, later to be described.

Turnably mounted within the housing 10 and concentric therewith is a turret, represented in its entirety by 18. The turret 18 has its bottom 19 concentrically mounted on the hub 21 of a gear 22 and is rotatable with the latter. The gear 22 meshes with a pinion 23, driven by a motor 24 through a reduction gear mechanism 25. The gear 22, which supports the turret 18, rests on a bearing 26, carried by the upper end of a bearing block 27, the latter having a flanged lower end 28 which rests upon the bottom 11 of the housing 10 and may be welded thereto, as shown at 29. The gear 22 is held concentric with the bearing block 27 by means of a vertical shaft 31, the lower end of the shaft 31 being journaled in a bearing 32 mounted within the tubular block 27. Concentric with the turret 18 and bearing block 27 is a tubular shaft 33 having a flanged lower end 34 resting upon the bottom 19 of the turret 18 and fixed to the bottom 19 and the hub 21 of the gear 22 by means of bolts 35. These bolts 35 maintain the tubular shaft 33, turret 18 and gear 22 in rigid, fixed relation and arranged to rotate in unison.

The vertical shaft 31 is held rigid within the tubular shaft 33 by means of the stop screws 36 and is turnable in unison therewith by the gear 22. The upper end of the tubular shaft 33 is flanged at 37, the latter being connected to the bottom of the top 38 of the rotatable turret 18 by means of bolts 39. Mounted on the top 38 of the turret 18 is a hub 41. The hub 41 is positioned concentric with the tubular shaft 33 and arranged to receive the shaft 31. The hub 41 is held rigid with the top 18 and turnable with the top 18 and tubular shaft 33 by means of the bolts 39, which extend through the flange 37 of the tubular shaft 33, bottom 38 of the turret 18 and into the bottom of the hub 41. The hub 41 is provided with an annular recess 42, forming lower and upper, horizontally extending, annular flanges 43 and 44, respectively. A plurality of radially disposed, vertically aligned openings 45 are provided through the flanges 43 and 44 for receiving bolts or shafts 46, the purpose of which will be later described. The shaft 31 extends above the hub 41 through a stationary bearing block 47 carried by the lower surface of the top 15. The bearing block 47 is flanged at its upper end 48 and connected to the bottom 15 by bolts 49. The upper end of the shaft 31 is arranged to receive a cam member 51 having a hub portion 52, the latter being fixed to and turnable with the shaft 31 by means of the stop screw 53.

Figure 14:
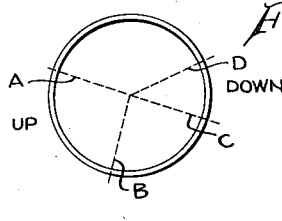
Fig. 14 is a diagrammatic illustration of a camway embodied in the invention.

It can now be understood that the turret 18, tubular shaft 33, shaft 31 and hub 41 and cam 51 rotate in unison with the gear 22, the latter being rotated at a predetermined speed by the motor 24 through the reduction gear mechanism 25 and pinion 23. In the form shown, the sides of the turret are octagonal in shape and each of the sections, indicated at 54, may include vertical, stationary slides 55. The slides 55 are formed to provide T-shaped tracks 56 for receiving reciprocating T-shaped supports 57 slidably mounted within the T-shaped track 56. Each of the slidable T-shaped supports 57 is provided adjacent its lower end with an outwardly extending stub shaft 58 having mounted thereon a roller 59. The T-shaped sliding supports 57 are arranged to reciprocate upwardly and downwardly within the T-shaped tracks 56 simultaneously with the rotation of the turret 18 carrying the slides 55. For the purpose of effecting the vertical reciprocation of the slides 55, there is provided a stationary, curved track, represented in its entirety by 61, in which the rollers 59 are arranged to travel. The track 61 may consist of spaced, curved members 62 and 63, the members 62 and 63 being spaced apart to form a passageway or cam-way 60 and are carried by projections 64 extending inwardly from the vertical channel-shaped stiffeners 14 fixed to the inner side walls of the housing 10. The curvature of the cam-way or passageway 60 is best shown in Figs. 1 and 14. The portion of the cam-way 60 as indicated between A and B in Fig. 14 is horizontal, the portion of the track as indicated between the points B and C slopes downwardly, the portion of the track as indicated between the points C and D is horizontal and the remainder of the track between the points indicated between D and A slopes upwardly. The cam-way 60 in plane is a cylindrical curved track. It can now be understood that as the turret rotates, the T-shaped slides or brackets 57 will reciprocate upwardly and downwardly in response to the rollers 59 traveling in the cam-way 60. The members 62 and 63 forming the cam-way 60 may be spaced from the projection 64 by means of spacer members 66 carried by bolts 67, the latter extending through plates 68 fixed to the projection 64.

The vertical members 55 providing the T-shaped tracks 56 extend above the top 38 of the turret 18, the upper ends of which are arranged to support a horizontally disposed, annular plate 71 on which is mounted an annular work table divided into eight sections, each of which is represented by the numeral 72. In the present embodiment, the apparatus is constructed to provide eight mechanisms for forming cylindrical dough into a toroid. These mechanisms are disposed radially with respect to the vertical axis of the apparatus and rotate in unison with the turret 18. Each of the sections 72 of the work table is provided with a central opening 70 through which vertical forming plungers 73 are arranged for vertical reciprocation. The lower end of the forming plunger 73 is attached to a bracket 58 by means of a bolt 75, the bracket 58 being slidably mounted in its cooperating T-shaped slide 57, so that as the turret rotates, the roller 59 on the lower end of the T-shaped slide traveling in the passageway 60 will cause the forming plunger 73 to move downwardly and upwardly in accordance with the curvature of the passageway 60. Positioned below each of the openings 70 is provided a vertical, cylindrical forming chamber, represented in its entirety by 74. Each of these forming chambers 74 consists of an upper cylindrical portion 74a. Depending from the cylindrical portion 74a and on the side in the direction of the rotation of the work table is substantially one-third of a cylinder indicated at 76. The forming cylinder 74 is completed by two, hinged, curved plates composing substantially two-thirds of a cylinder. These plates are indicated at 77 and 78. The adjacent ends of the cylinder segments 77 and 78 are hinged together at 79. The stationary segment 76 of each forming cylinder is supported by a member 81, the inner end of which rests on the octagonally shaped top 38 of the turret and may be welded thereto, as shown at 82. The stationary segment 76, which is integral with the upper cylindrical portion 74a of the forming cylinder, may be bolted to the member 81 by means of bolts 84. The hinged, movable segments 77 and 78 of the forming cylinder are pivotally supported on a link 85, as shown at 86, the link 85 having one of its ends pivotally connected to an arm 87, as shown at 88, the inner end of the arm 87 being pivotally connected to the hub 41 by means of the bolt or shaft 46, as shown at 89. The function and operation of the pivoted segments 77 and 78 of the forming chamber will be later described.

Figure 5:
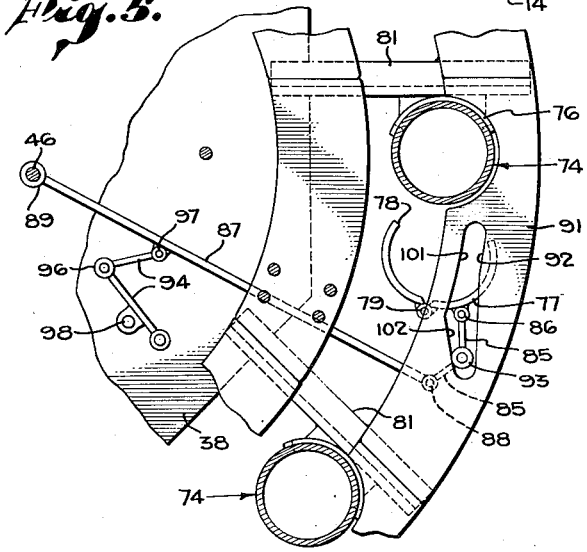
Fig. 5 is a fragmentary, sectional view taken along the line V—V of Fig. 1.
Figure 6:
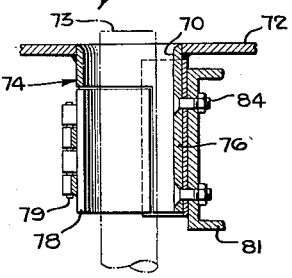
Fig. 6 is a sectional view taken along the line VI—VI of Fig. 4.
Figure 7:
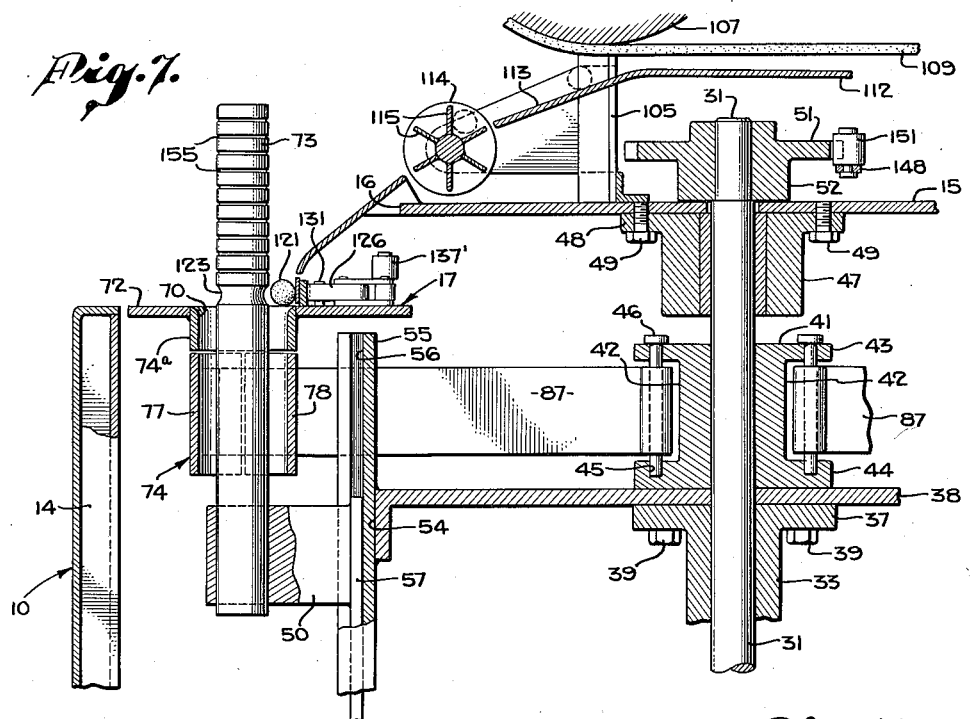
Fig. 7 is a sectional view taken along the line VII—VII of Fig. 2.
Figure 8:
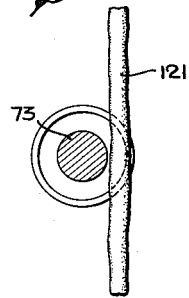
Figs. 8, 9 and 10 illustrate the various steps of forming the cylindrical dough into a toroid.
Figure 9:
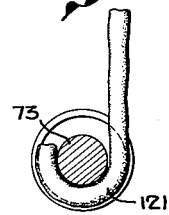
Figure 10:
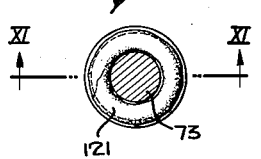
Figure 11:
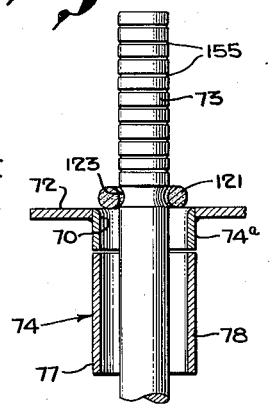
Fig. 11 is a sectional view taken through one of the forming chambers showing the dough folded about a forming plunger prior to rotating the dough about a vertical axis for connecting and amalgamating the dough into an integral toroid.
Figure 12:
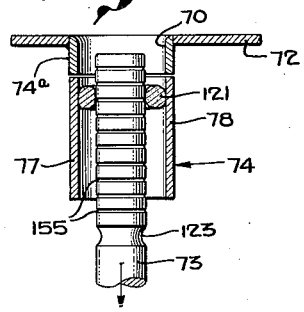
Fig. 12 is a view similar to Fig. 11 showing an intermediate position of the dough in the forming chamber.
Figure 13:
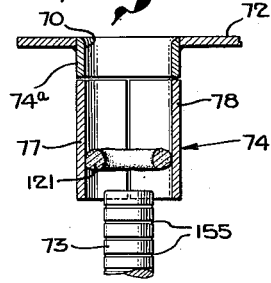
Fig. 13 is a view similar to Fig. 12 and shows the position of the forming plunger subsequent to the completion of rotating the ring of dough about its axis.

Mounted on the outer, upper ends of the supports 81 is a horizontally disposed, annular plate member 91. The annular plate 91 is positioned below the plane of the work table 72 and is provided with cam slots 92 for cooperating with upwardly extending cam rollers 93 carried by the links 85. Each of the links 85 consists of two parts pivoted in the center at the point in which the cam roller 93 is carried. Each of the cam slots 92 is so formed that when the arm 87, which is controlled by link 94, is moved in the opposite direction relative to the direction of rotation of the work table, the hinged segments 77 and 78 of the forming cylinder will be moved in a direction away from the rotation of the work table and out of contact with the stationary segment 76 of the forming cylinder. The movement of the arm 87 is effected by means of an upstanding cam roller 96 carried at the pivot point of each of the links 94, one end of the link 94 being pivotally connected to its associated arm 87, as shown at 97, and its other end pivotally connected to the upper surface of the octagonal shaped turret top 38, as shown at 98. As the cam roller 96 is brought into contact with the stationary cam surface 99, the link 94 will be turned about the pivot point carrying the cam roller 96 and cause the link 87 to be drawn rearwardly toward the stationary pivot point 98 of the link 94 (see Fig. 5). During this movement, the cam roller 93 carried by the link 85 will be moved rearwardly in the cam slot 92 for the distance indicated by the straight portion 101 and thereby carrying the toroid away from the stationary segment 76 from the forming cylinder, and as the cam roller 93 contacts the angular portion, indicated at 102, of the cam slot 92, the segments 77 and 78 of the forming cylinder will be caused to spread apart about their pivot point 79 and permit the toroid to fall therefrom onto a slide 103 carried by each of the octagonal faces 54 of the top 38 of the turret 18. The slide 103 is adapted to deliver the toroid to a suitable conveyor, indicated at 104.

Positioned above and carried by the top 15 of the housing 10 is a framework consisting of vertical standards 105, the tops of the standards 105 being connected by horizontal angular members 106, the members 105 and 106 providing a supporting frame for spaced pulleys 107, these pulleys being rotatably mounted on the horizontal frame members 106 by means of suitable bearing blocks, as indicated at 108. An endless belt 109 is provided around the pulleys 107. Any suitable means not shown may be employed for rotating either one of the pulleys 107 for causing the endless belt 109 to travel continuously around the pulleys 107. Divided dough to be formed into cylindrical shape and later into the shape of a toroid is intermittently deposited on the upper surface of the belt 109, as shown at 110. For the purpose of rotating the divided dough into cylindrical form there is provided a band 111 extending from substantially midway the top of the belt 109 around the right end of the belt 109 and back under the belt for substantially the horizontal length of the belt, as indicated at 112. From the point 112 the band diverts downwardly, as indicated at 113, where it is arranged to deliver the cylindrical dough onto a roller 114. The roller 114 is provided with a plurality of longitudinally extending fins or projections 115, forming troughs for receiving individual pieces of cylindrical dough, the operation of which will be later described. The band 111 is spaced from the belt 109 a predetermined distance to provide cylindrical dough of the desired diameter, and at the entrance of the band 111 there may be provided an upwardly extending portion 116 for guiding the divided dough under the band 111. The band 111 may be supported by a framework, indicated generally at 117, and attached thereto by bolts 118, the latter having a spring therearound and interposed between the band 111 and support 117, whereby the band 111 is permitted a degree of flexibility during the passage of the dough between the band 111 and the belt 109. The band 111 and the peripheral surface of the right-hand pulley may be so formed as to terminate the ends of the cylindrical dough somewhat tapered and reduced so that the overlapping of the ends in forming the toroid will result in a uniform diameter.

Means is provided for successively rotating the roller 114 for successively delivering cylindrical dough, indicated at 121, onto a section 72 of the work table and in alignment with the forming groove 123 provided around the forming plunger 73. Means is provided for folding the cylindrical dough 121 about the forming groove 123. The means for folding the dough about the forming groove 123 is best seen in Figs. 2 and 3, wherein oppositely disposed, semi-circular bands 124 and 125 are pivoted at their centers to curved links 126 and 127, as shown at 128 and 129, respectively. The other ends of the curved links 126 and 127 are pivoted onto their respective sections 72 of the work table, as shown at 131 and 132, respectively. The semi-circular bands 124 and 125 are arranged to engage a flexible band 133, the latter being fixed at its center to its cooperating section 72, as shown at 134. Cam means is provided for alternately causing the link 127 and link 126 to move the semi-circular bands 125 and 124 toward the forming groove 123. In so doing, the semi-circular portions 125 and 124 alternately fold the cooperating ends of the flexible band 133 into engagement with the cylindrical dough and fold the associated portions thereof about the forming groove 123 of the forming plunger 73.

In the operation of the device, the cam means first folds one end of the cylindrical dough about the forming groove 123 by means of the curved lever 127 and its associated parts. Thereafter, the folding mechanism carried by the curved lever 127 is released from the dough and the other end of the cylindrical dough is folded about the forming groove by means of the curved lever 126 and its associated parts. The ends of the dough are somewhat overlapped and pressed into sufficient contact as to cause the dough to remain in circular form. The cam means for operating the curved lever 127 consists of a lever 135 pivoted intermediate its ends to section 72, as shown at 136. The free end of the lever 135 is provided with an upstanding cam roller 137, arranged to contact spaced stationary cams 138 and 139, the spaced stationary cams being carried by and projecting downwardly from the under surface of the stationary top 15 of the housing 10. The other end of the lever 135 is pivotally connected at 141 to one end of lever 142, the other end of the lever being pivotally connected to the curved lever 127, as shown at 143. The cam mechanism for actuating the curved lever 126 employs similar levers 135′ and 142′, except the levers 135′ and 142′ are each oppositely disposed from the levers 135 and 142, as clearly depicted in Figs. 2 and 3. It can now be understood that as the work table rotates, carrying with it cam roller 137, the latter will contact the cams 138 and 139 and cause the lever 127 to oscillate about its pivot point 132 for folding one-half of the cylindrical dough about the forming groove 123, and that as the cam roller passes through the cam surface afforded by the cams 138 and 139, the roller 107 will cause its associated levers to retract the curved lever 127 away from the forming groove, and that as soon as the cam roller 137' comes into contact with the cams 138 and 139, the curved lever 126 will be caused to oscillate about its pivot point 131 for folding its associated end of the dough about the forming groove in the same manner as that described in connection with the curved lever 127. It is to be noted that each of the sections 72 of the octagon shaped top 39 of the turret is provided with similar means for folding the dough about the forming groove 123 of the forming plunger 73 associated with each of the sections 72.

Means is provided for consecutively delivering cylindrical dough onto the work table, which means consists of a ratchet 144 actuated by a pawl 145, the latter being carried by the outer end of the lever 146, the other end of the lever 146 being pivoted at 147 to a lever 148, the latter pivoted at an intermediate point, as indicated at 149, to the top 15 of the housing 10. The free end of the lever 148 is provided with a cam roller 151, the latter being held into contact with the cam 51 by means of a spring 152 having one end attached to the lever 148, as shown at 153, and its other end attached to the supporting structure 105, as shown at 154. The cam 51 is divided into eight equal cam surfaces, and since the cam 51 rotates in unison with the work table, the roller 114 will turn accordingly and deliver a piece of cylindrical dough onto the work table as each of the sections 72 are brought into alignment with the roller 114.

Figure 4:
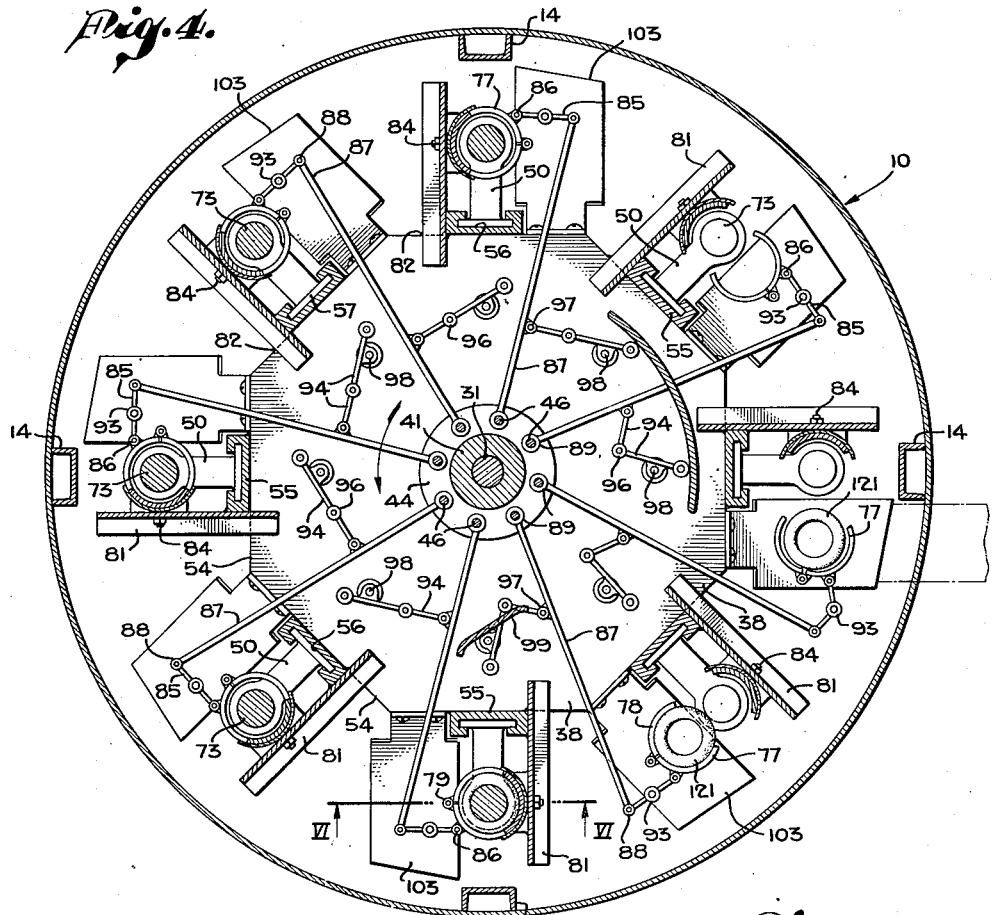
Fig. 4 is a sectional view taken along the line IV—IV of Fig. 1.

The operation of the device is as follows. The divided dough, as indicated at 110, is provided onto endless belt 109, the latter operating to carry the dough through the passageway defined by the belt and the band 111 for delivering the cylindrical dough onto the longitudinal grooves of the roller 114, the latter being rotated in timed relation by way of the cam 51, which operates the ratchet 145 for turning the roller 114 one-eighth of a revolution during the rotation of the turret 118 one-eighth of a revolution, and thereby supplying a piece of cylindrical dough successively onto the work table 72 in alignment with the associated forming cylinder and forming plunger, and as the turret rotates in a counterclockwise direction, as viewed in Figs. 2 and 3, the curved levers 127 and 126 will be actuated by their respective cam rollers 137 and 137', as above described, to fold the dough about the forming groove 123 provided on the forming plunger 73. This operation takes place during the travel of the forming plunger 73 through the horizontal distance, as indicated between A and B in Fig. 14. As each of the forming plungers 73 reaches the point B, the track 61 defining the passageway 60 through which the cam roller 66 travels, will cause the forming plungers 73 to be brought downwardly. The upper surface of the forming plunger 73 may be serrated or provided with grooves, as indicated at 155. These grooves or serrations 155 engage the inner surface of the toroid-shaped dough, and as the plunger 73 moves downward during the travel of its associated sections 72 from the point B of the passageway 60 to the point C, the toroid will be carried downwardly through the forming cylinder 74 and will be caused to rotate about an axis within its plane, which rotation inter-meshes and works the overlapping ends of the cylindrical dough into a homogenous mass; and as the section 72 travels between the distance indicated between B and C of the Fig. 14, the cam mechanisms consisting of the stationary cam 98 and cam roller 96 actuate to separate the segments 77 and 78 of the forming cylinder from the stationary segment 76, and the movement of the cam roller 93 in the cam slot 92 functions to open the hinge segments 77 and 78 for permitting the formed toroid to fall onto the slide 103, the latter operating to deliver the toroid to the conveyor 104. This operation is completed during the rotation of the turret through the distance as indicated between the points A and C. During the movement of the sections 72 between the points as indicated by C and D a cam roller 80 extending upwardly from the pivot point 88 of the link 84 will contact the inner surface of a stationary cam 90 depending from the under surface of the top 15 of the housing and cause the roller 80 to straighten the link 84, the latter urging its cooperating arm 87 in a counterclockwise direction as viewed in Fig. 4 during which movement the link 85 is straightened by the cooperating cam roller 83 in cooperation with cam slot 92 and moving the sections 77 and 78 of the forming cylinder into assembled relation. In the remainder of the rotation of the turret from the point D to the point A, the passageway 60 operates to move the cooperating forming plunger 73 upwardly by means of the T-shaped slide 57 guided by the T-shaped track 56, as above described, so that as each of the sections 72 come into alignment with the roller 114, the latter will operate to deliver a cylindrical piece of dough onto the work table and in alignment with the forming plunger 73. This operation is completed eight times during a single rotation of the turret 18 and thereby effects a continuous flow of formed toroids to the conveyor 104.

The apparatus provides a method of forming dough into a toroid of virtually uniform thickness and consists of the steps of rolling the dough into a cylindrical form, the ends of which may terminate slightly tapered, the length of which is greater than the main diameter of the desired toroid, folding the cylindrical-shaped dough into annular form with its ends in overlapping relation for forming an irregular toroid and then in rolling the toroid along its axis of revolution while subjecting it to virtually uniform radial pressure along its entire circumference to form a regular toroid of uniform diameter.

Accordingly, there is provided a method and apparatus for forming dough into the shape of a toroid that is efficient and positive in operation to deliver a continuous flow of toroid-shaped dough. The apparatus is automatic in operation and except from the belt mechanism forming the dough into cylindrical form, the entire mechanism is actuatable from a single, vertical, axially disposed shaft within the apparatus. The movable parts of the apparatus are subjected to very little friction and comparatively little lubrication is required to prevent wear and tear on the movable parts. The operation of the device is continuous, positive and foolproof and is much needed in the trade, as toroids formed from certain dough, such as that used in the production of bagels, has of necessity heretofore been accomplished manually.

We claim:

1. An apparatus for forming dough including a supporting structure, a turret rotatably mounted within said structure, means for rotating said turret, a work table carried by said turret including a plurality of radially disposed work sections, forming chambers carried by each of said sections, a forming plunger arranged for reciprocation through each of said forming chambers, each of the forming plungers extending axially through its respective chamber in spaced relation to the walls thereof, means for supplying cylindrical dough pieces successively onto said work sections, means for folding a piece of cylindrical dough about said forming plunger, and means for lowering the said forming plunger downwardly through said forming chamber for rolling the folded dough along its axis of revolution whereby the folded dough is subjected to virtually uniform radial pressure along its entire circumference.

2. An apparatus in accordance with claim 1, wherein each of the said forming chambers includes a cylindrical portion fixed rigidly to its cooperating work section and a movable portion supported by said turret independent of said work section, and means for moving the said independently supported portion of said forming chamber out of and into assembled relation with the said cylindrical portion of said forming chamber.

3. An apparatus in accordance with claim 1, wherein the said means for rotating the said turret includes a single means for actuating a means for vertically reciprocating the said forming plungers during the rotation of said turret.

4. An apparatus in accordance with claim 1, wherein the said means for rotating the said turret includes a single means for actuating a means for vertically reciprocating the said forming plungers during the rotation of said turret, the said reciprocating means including an arcuate-shaped track circular in plan, a vertical track, a slide in said track having a cam roller arranged to engage and pass along the said arcuate-shaped track.

5. An apparatus for forming dough into a toroid including an annular work table divided into a plurality of radially disposed work sections, means for rotating said annular work table, means for successively delivering a piece of cylindrical dough onto said work sections, means carried by each of said work sections for folding the dough into a closed curve, and means for rotating the curved dough about an axis in its plane to form the dough into a homogenous toroid.

6. An apparatus in accordance with claim 5, wherein means is provided for rotating the said annular work table; the said means including a rotatably mounted turret having an axially disposed shaft rotatable therewith, the said shaft being arranged to actuate the said means for successively delivering dough onto the said work sections.

7. An apparatus for forming dough into a toroid including a rotatable work table divided into a plurality of radially disposed work sections, means for rotating said work table, means for successively delivering pieces of cylindrical dough of predetermined length onto the said work sections, cam means carried by each of said work sections for folding the cylindrical dough about a forming plunger, a forming cylinder carried by each of said work sections through which the said forming plungers are arranged to axially reciprocate, means for reciprocating the said forming plunger, the last said means including an arcuate-shaped track arranged to receive and guide rollers connected to said forming plunger, the said rollers being separately, slidably carried by a rotatable turret and means for rotating said turret.

8. An apparatus for forming dough into a toroid including a rotatable work table divided into a plurality of radially disposed work sections, means for rotating said work table, means for successively delivering pieces of cylindrical dough onto the said work sections, cam means carried by each of said work sections for folding the cylindrical dough about a forming plunger, a forming cylinder carried by each of said work sections through which the said forming plungers are arranged to reciprocate, means for reciprocating the said forming plunger, the last said means including an arcuate-shaped track, arranged to receive and guide rollers connected to said forming plunger, the said rollers being separately, slidably carried by a rotatable turret and means for rotating said turret, the means for rotating said turret including the said means for rotating said work table.

9. An apparatus in accordance with claim 8, wherein each of the said forming cylinders consists of a section stationary relative to its associated work section, and a hinged section movable relative to said work section, and cam means actuated by the rotation of said turret for moving the said hinged section into and out of assembled relation with the said fixed section of said forming cylinder.

10. An apparatus in accordance with claim 8, wherein each of the said forming cylinders consists of a section stationary relative to its associated work section, and a hinged section movable relative to said work section, and cam means actuated by the rotation of said turret for moving the said hinged section into and out of assembled relation with the said fixed section of said forming turret, the last said means including cam means for actuating said hinged section, the said hinged section arranged to displace a toroid from the said fixed section of said forming chamber and deliver said toroid to a slide, the latter being positioned for delivering the said toroid onto a discharge conveyor.

11. An apparatus for forming dough into a toroid comprising, in combination with a source of pieces of cylindrical dough: a rotatably mounted work table provided with a plurality of circumferentially disposed work sections; a cylindrical forming chamber extending downwardly from each of the work sections; a reciprocatingly mounted forming plunger axially positioned in each of the forming chambers in spaced relation to the walls of such chamber; means carried by each work section of the table to fold a piece of cylindrical dough about a forming plunger; means for rotating the work table; means for reciprocating said forming plungers in timed relation to rotation of the work table; and means for supplying pieces of cylindrical dough from a source to said work sections in succession and in timed relation to rotation of the work table.

12. An apparatus of the character stated in claim 11 wherein each of the forming plungers is provided with a circumferential forming groove arranged to receive a dough piece being folded about the plunger.

13. An apparatus of the character stated in claim 11 wherein each of the folding means includes arcuate forming elements arranged to move flexible band means against a piece of dough.

14. An apparatus of the character stated in claim 11 wherein each of the forming plungers is provided with a circumferential forming groove arranged to receive a dough piece being folded about the plunger, and each of the folding means includes a flexible band and arcuate forming elements arranged to move the flexible band against a piece of dough.

15. An apparatus of the character stated in claim 11 wherein each of the forming plungers is provided with a roughened surface to contact the internal surface of a dough piece folded therearound and roll said piece into the forming chamber during downward reciprocation of the forming plunger.

MEYER THOMPSON.
DANIEL T. THOMPSON.

REFERENCES CITED

The following references are of record in the file of this patent:

UNITED STATES PATENTS

| Number | Name | Date |
|---|---|---|
| 1,552,430 | Gendler | Sept. 8, 1925 |
| 1,755,921 | Gendler | Apr. 22, 1930 |
| 2,263,490 | Fox | Nov. 18, 1941 |
| 2,365,349 | MacManus | Dec. 19, 1944 |